June 17, 1952  C. F. DE VOE  2,600,490
GLASS MELTING METHOD
Filed April 21, 1947
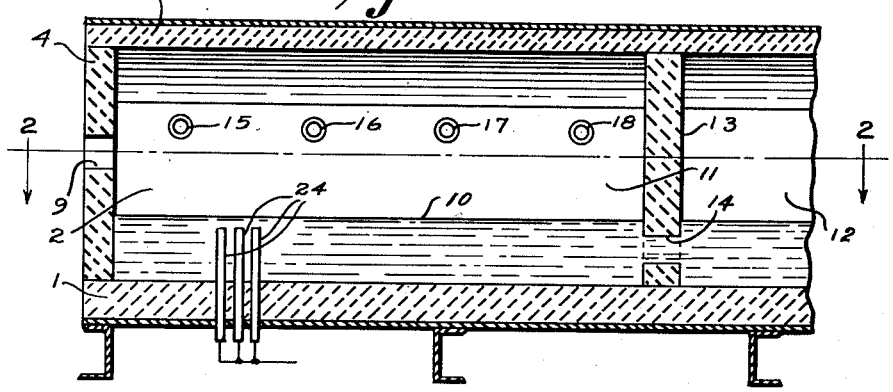
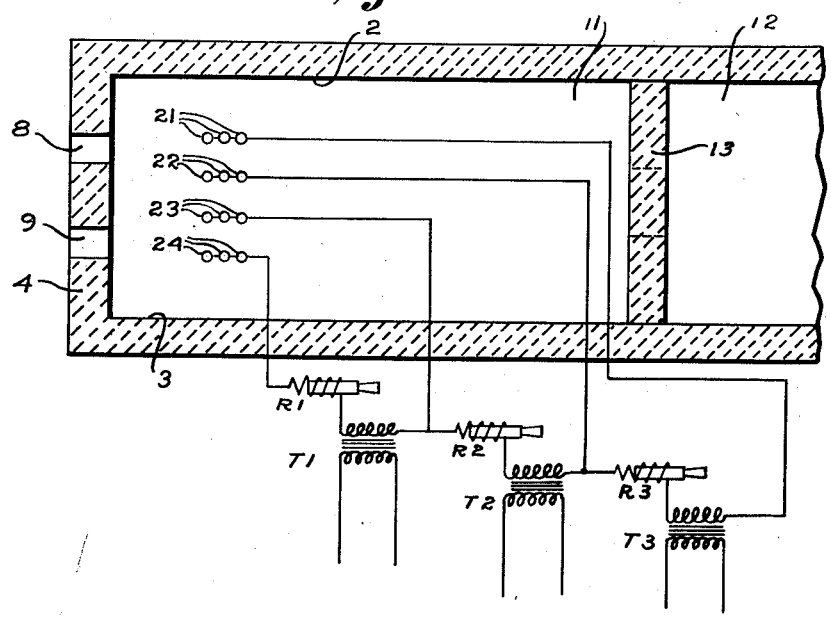
Inventor
CHARLES F. DEVOE
By Knight & Fowler
Attorneys Patented June 17, 1952

2,600,490

UNITED STATES PATENT OFFICE 2,600,490

GLASS MELTING METHOD

Charles F. De Voe, Corning, N. Y., assignor to Corning Glass Works, Corning, N. Y., a corporation of New York Application April 21, 1947, Serial No. 742,829

1 Claim. (Cl. 13—34)

The present invention relates to glass melting furnaces and particularly to furnaces designed for melting glass by combustion heat transmitted to the batch and the glass directly from the flame, by convection, and by radiation from the top and side walls of the furnace which are also heated by the flame. In the foregoing type of heating the melting rate and hence the capacity of the tank are definitely limited by the amount of heat which can be transmitted to the glass without abnormal detrimental effect to the refractory walls and top of the furnace. Applicant has found that the maximum output of a combustion heat furnace can be materially increased by augmenting combustion heat with heat electrically introduced into the glass by the Joule effect; that electrical heating can be carried on in a manner to materially improve the efficiency of combustion heating; and that such improvement can be attained without shortening the life of the furnace.

The prime object of the invention, therefore, is the addition to the melting tank of a combustion type glass melting furnace of facilities whereby its efficiency and production rate can be materially increased without adversely affecting the life of the furnace.

Other and more specific objects of the invention including details of the arrangement and location of the electric heating facilities will be more fully set forth in and appreciated from a reading of the following specification and appended claim, when considered in conjunction with the accompanying drawing in which:

Fig. 1 is a view in vertical section of a portion of a glass melting furnace embodying the invention, certain parts being shown diagrammatically and others omitted;

Fig. 2 is a sectional plan view on lines 2—2 of Fig. 1 with electrical circuits applied in diagrammatical fashion.

Referring to the drawing, the invention is applied to a conventional form of glass melting tank including a bottom 1, side walls 2 and 3, an end wall 4, and an arched roof 7. Batch feed openings 8 and 9 are located in end wall 4 at a substantial height above the glass line 10. For example, in a tank having an internal dimension of 16 x 44 feet and a normal glass depth of approximately three feet, openings 8 and 9 may have their center line as high as three and one-half feet above the glass line. The tank may be divided into melting and fining compartments 11 and 12 by the usual bridge wall 13 having a throat 14 through which melted glass passes to the fining compartment.

As illustrated, the combustion heating means includes a plurality of burner openings 15–18 through which fluid fuel may be injected into the chamber 11 above the normal level 10 of the glass therein. Suitable air inlet ports and ports for the outlet of products of combustion may also be provided, these ports not being shown. It will be understood, however, that any usual or desired construction may be employed in connection with the furnace for saving heat by regeneration or recuperation and for supplying heat derived from combustion to the glass and glass making materials or batch, that which is diagrammatically illustrated being but an example of combustion means which may be provided.

Electrode element groups 21–24, each composed of elements two to three inches in diameter, are projected into the tank through the bottom thereof arranged in a row transverse of the tank and terminating below the metal line 10. Assuming a tank of the dimensions given in the example, the row of electrode element groups 21–24 is preferably placed no nearer than six feet from the end wall 4, but should not be moved forward a distance exceeding 12 feet from such end wall. Also, electrode groups 21 and 24 should be spaced from their adjacent side walls 2 and 3 at least as great a distance as the spaces between electrode groups. In the example structure, the space between electrode groups is approximately two and one-half feet.

As illustrated in Fig. 2, the electrode groups are supplied with electrical potential by transformers T1—T3 and the current densities in the glass between the respective groups are controlled by the setting of direct current saturable core reactors R1—R3. With the electrode groups arranged as illustrated and the foregoing circuit arrangement provided therefor, a series of coextensive current paths through the glass in a direction transverse to the direction of flow of glass through the furnace is provided.

Operation

To explain the improvement in efficiency and increase in output made possible by use of electric heating, the conditions which prevail during maximum output by means of combustion heat alone will first be briefly described. In the normal operation, batch fill extends from the bottom 1 of the furnace up to the filling openings 8 and 9 and is continuously acted on by the combustion flames introduced into the furnace. If attempt is made to force the furnace the combustion flames are unable to melt the batch materials as rapidly as they are received. As a consequence the batch fill attains a height in which it deflects the flames with excessive intensity toward the furnace roof and if the condition is allowed to continue destruction of the furnace structure results.

At far greater rates of fill with a relatively small amount of electric current passed through the glass between electrode groups located and arranged as illustrated, convection currents are set up which bring glass from the area in advance of the electrode groups into the area to the rear thereof in a manner to undermine the batch pile built up during combustion heating alone and to completely melt and dissolve it. By utilization of electric energy to maintain the tank free of a batch pile, combustion heating is better distributed over the glass surface and is thus made more efficient. This added efficiency plus the melting capacity added electrically enable a very substantial increase in melting rate with no increase in furnace wall or roof temperature so that the normal furnace life is maintained or even prolonged.

The action of convection currents which are set up in the glass between the electrode groups and which function so effectively to melt down the batch pile is not fully understood. It appears that a back flow of glass occurs between electrode groups to such an extent that little or none of the newly melted batch moves forward in these areas so that the row of electrode groups with potential applied thereto may be said to function as a dam to thermally check the flow of batch materials therebetween into the main body of the pool while the newly melted batch forms two streams, the one passing between the furnace side wall 2 and electrode group 21 and the other passing between the side wall 3 and the electrode group 24. For this reason for such successful operation it is essential that the end electrode groups in the row be kept substantially spaced from the tank side walls.

Although the locations given for the electrode groups employed and of the batch feed openings have been specified for a tank structure of a given dimension, this has been for purposes of example only and it will be understood that these locations will necessarily be modified in varying degrees with variations in size and proportions of tank structures and height of the batch supply openings. Also, although in the example structure four electrode groups are disclosed, when glasses of high electrical conductivity are being melted, it is possible to omit electrode groups 22 and 23 and to apply the necessary differential potentials to the remaining electrode groups 21 and 24. In addition, as will be clearly understood, each electrode group connected to the same terminal of a source of electrical current is equivalent to a single electrode having the same surface of contact with the glass. The invention, therefore, is not to be limited except by the scope of the appended claim or as may be made necessary by the prior art.

I claim:

A method of melting glass involving a continuous glass flow which comprises directing combustion heat into a glass-melting zone containing liquid glass, introducing raw glass batch materials into one end of such zone at a rate greater than that at which the supplied combustion heat can melt such batch materials to replace liquid glass withdrawn from such zone at such greater rate, supplying supplemental melting heat to the liquid glass in such zone to make up the combustion heat deficiency by the passage of an electric current transversely of the glass flow through such zone, creating such passage of electric current solely in a transverse section terminating substantially short of the lateral limits of such zone and extending through the liquid glass from the bottom of such zone to substantially the top glass level, said section being adjacent the point of introduction of such raw batch materials into such zone, and controlling the said passage of electric current to establish a convection flow of liquid glass through such section from the area in advance thereof to the area in the rear thereof and then from the area in the rear thereof to the former area via the spaces in such zone extending beyond the lateral limits of such transverse section.

CHARLES F. DE VOE.

REFERENCES CITED

The following references are of record in the file of this patent:

UNITED STATES PATENTS

| Number | Name | Date |
|---|---|---|
| 706,283 | Voelker | Aug. 5, 1902 |
| 762,270 | Benjamin | June 14, 1904 |
| 805,139 | Hitchcock | Nov. 21, 1905 |
| 1,594,496 | Clark | Aug. 3, 1926 |
| 1,610,376 | Hitner | Dec. 14, 1926 |
| 1,880,541 | Wadman | Oct. 4, 1932 |
| 1,944,855 | Wadman | Jan. 23, 1934 |
| 1,992,994 | Delpech | Mar. 5, 1935 |
| 2,225,616 | Borel | Dec. 24, 1940 |
| 2,293,948 | Peyches | Aug. 25, 1942 |

FOREIGN PATENTS

| Number | Country | Date |
|---|---|---|
| 568,469 | Great Britain | Apr. 6, 1945 |
| 597,843 | Great Britain | Feb. 4, 1948 |